Nov. 17, 1964 R. W. GARBER 3,157,316
ROW MARKER
Filed Jan. 11, 1963

INVENTOR.
ROY W. GARBER
BY
Charles W. Hull
Attorney 3,157,316
ROW MARKER
Roy W. Garber, Elizabethtown, Pa., assignor to Jackson Manufacturing Company, Harrisburg, Pa., a corporation of Pennsylvania
Filed Jan. 11, 1963, Ser. No. 250,833
9 Claims. (Cl. 222—169)

This invention relates to spreaders for dispensing seed, fertilizer or other pulverant or granular materials. More particularly, this pertains to a device for marking the path taken by such a spreader so that a person operating the spreader may more accurately determine the area which has been previously covered.

Spreader devices of the general type involved are well known, and are usually used for tending lawns by seeding or fertilizing. During operations such as this, the operator must be careful to avoid leaving gaps between the paths laid during subsequent runs, and also to avoid overlapping. This is especially true when spreading fertilizer since a double strength may burn the grass and impede rather than accelerate growth. If the spreading operation is not done accurately, the lawn will present an erratic patchwork-like appearance which naturally is a most unwanted effect.

It is an object of this invention to provide a device designed to be attached to a spreader which will enable the operator to clearly see the area which has previously been covered.

Another object is to provide such a device which is easily installed and removed, simply manufactured, and relatively inexpensive, thus answering a definite need in the spreader art.

A further object is to offer a marking device which utilizes a most convenient and readily available source of marking material, such as a can of ordinary household cleanser.

Still another object is to provide a marking device which may easily be mounted on spreader devices of earlier manufacture, by using structure which may readily be inserted in the rolled flange at the forward edge of the spreader hopper.

These objects are realized by providing a rotatable wheel on which a container filled with marking material is mounted. The container has at least one isolated discharge section with at least one dispensing aperture. The wheel is rotated to intermittently invert the container to dispense the marking material.

These and other objects will be more clearly understood by references to the accompanying drawing wherein FIG. 1 is a perspective view of the marker device of the instant invention mounted on a spreader and shown in a marking position;

Figure 1:
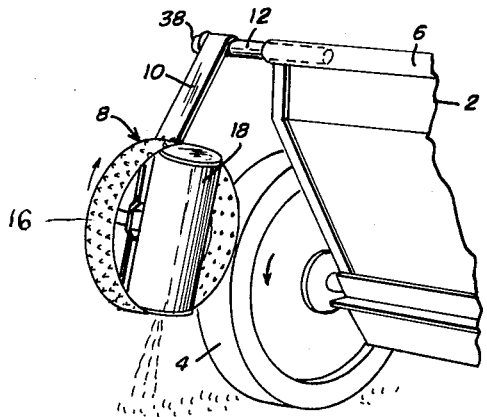

In the drawings, a fairly conventional spreader is illustrated, in that it has a hopper 2 supported by wheels such as shown at 4. The forward edge of the hopper has a rolled flange 6, in which the marking device, generally designated 8 is mounted.

The marking device 8 comprises an arm 10 which is rolled at each of its ends. One end of the arm carries a supporting rod 12 and the other end rotatably receives an axle 14 to which a marking wheel 16 is attached. A container 18, preferably a can of household cleanser such as "Bon Ami" with suitable dispensing apertures 40, is carried within the marking wheel 16. A portion of the container 18 extends outside wheel 16. The arm 10 is free to swing about its supporting rod 12, so the weight of the device causes the marking wheel 16 to rest against the spreader wheel 4.

Thus, when the spreader is pushed across the ground by an operator, the rotation of the spreader wheel 4 imparts rotation to the marking wheel 16. This causes the container 18 to rotate and periodically discharge the marking material through its aperture. A path of broken lines of marking material is therefore left behind the spreader to show the operator where the seed or fertilizer has been deposited. This, of course, enables a convenient determination of the path to be followed during subsequent passes.

If desired, the marking devices may be placed on both sides of the spreader.

Figure 2:
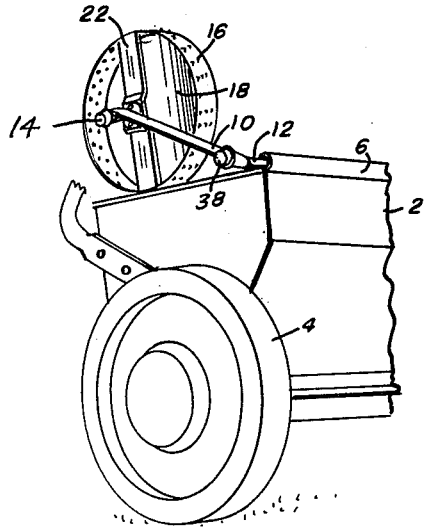
FIG. 2 is a perspective view showing the marker device in a non-marking position.

When, for any reason the operator does not wish to mark the spreader path, the marking device may be pivoted to assume the position shown in FIG. 2. Since in this position the marking wheel rests on the hopper edge and does not rotate, no marking material will be dispensed. Conceivably a counterweight on wheel 16 may be used to keep the container in an upright position.

Figure 3:
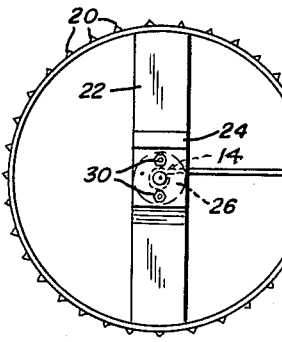
FIG. 3 is a side view of the marking device removed from the spreader on an enlarged scale.
Figure 4:
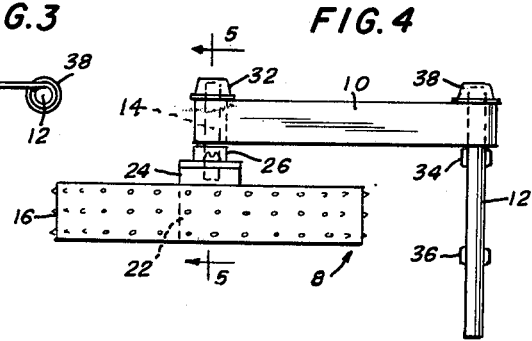
FIG. 4 is a top view of the marking device.
Figure 5:
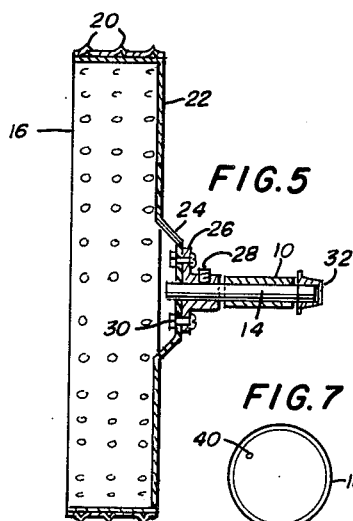
FIG. 5 is a cross-sectional view of the device, taken along the line 5—5 in FIG. 4 on an enlarged scale.

The details of construction may be seen in FIGS. 3, 4 and 5. The marking wheel 16 is a thin metal member which has been bent into a circular configuration. Its outer surface is roughened by a series of small perforations, made from the inside to create a plurality of burrs 20. These improve the traction of the marking wheel 16 with the spreader wheel 4. Alternatively, the outer face of the wheel may carry an abrasive material to improve traction.

A diametrically oriented plate 22, attached across the wheel 16 has an offset center portion 24 to which the axle 14 is connected. The axle is attached to a hub member 26 by suitable means such as a set screw 28, or by hammering the end of the axle. Fasteners 30 attach the hub 26 to the plate 22.

The axle 14 is received by the rolled end of arm 10 which serves as a bearing. A cap 32, frictionally received, or other means is used to retain the axle within the rolled end of the arm 10.

The supporting rod 12, at the hopper end of arm 10 has sets of radially extending projections 34 and 36 which help maintain the arm 10 in its proper position. Projections 34, assisted by cap 38 prevent the roller end of arm 10 from sliding axially along the rod 12. Projections 36 limit the extent to which the rod may be inserted into the hopper flange 6.

For unflanged hoppers, other means such as clamps or fasteners may be used for attaching the supporting rod 12.

As indicated above, a can of household cleanser is the preferred source of marking material, and this may easily be mounted within the marking wheel 16, as shown in the drawings. The top of the can will usually be punctured to form a small aperture 40 which may be 0.070 inch in diameter and near the edge of the can. This aperture is located so that the contents flowing therethrough will fall to mark the edge of the path of material dispensed by the hopper.

Figures 7, 8:
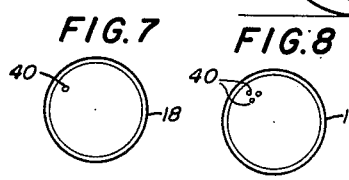
FIGS. 7 and 8 are views of the ends of the containers of marking material showing patterns of punched holes.

The general area of the discharge aperture 40 may be considered a discharge section, and more than one aperture may be located in this discharge section. An array of three such apertures is shown in FIG. 8.

If desired there may be more than one discharge section, provided they remain sufficiently isolated from each other. Suitably isolated discharge sections would result if both ends of container 18 were punctured, thus marking the path of the spreader with a broken trail with twice as many markings as achieved with the container having a single discharge section.

Figure 6:
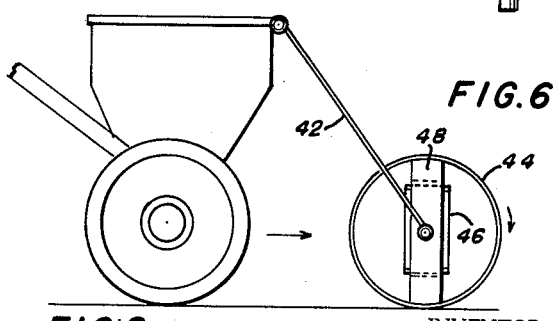
FIG. 6 is a view of a modified form of the marking device.

A modified form of the invention is shown in FIG. 6 where an arm 42 is long enough to permit wheel 44 to roll along the ground. The wheel 44 is larger than wheel 16, and a container 46 is supported on plate 48 in a manner so that the discharge aperture is spaced above the surface of the ground.

From the above, it can be seen that the objects of this invention are fully satisfied, and that a definite contribution has been made to the art by the development of this device. It is to be noted that on rotation of the mounting wheel, the powder in the elongated can tends to shift from higher end to lower end and a shaking effect takes place to loosen and force out the powder.

It is understood, of course, that the invention disclosed herein is not limited only to the embodiments shown and described above, but by the claims which appear herebelow.

I claim:

1. In a spreader, the improvement comprising a device for marking the path taken by said spreader, said marking device comprising a pivotal frame having a wheel rotatable about a substantially horizontal axis, a container having therein marking material, means rigidly holding said container to said wheel for rotation therewith, said container having at least one isolated discharge section with at least one discharge aperture therein in substantial alignment with the adjacent edge of the spreader, means for rotating said wheel in response to the movement of said spreader across a surface to be covered; whereby said container rotates with said wheel to periodically dispense said marking material along the edge of the spreader path.

2. In a spreader, the improvement defined by claim 1 wherein means are provided to maintain said container in spaced relationship from the surface to be covered.

3. In a wheel supported spreader, the improvement comprising a device for marking the path taken by the spreader, said marking device having a marking wheel rotating about a substantially horizontal axis, a container having therewithin marking material, means rigidly holding said container on said wheel for rotation therewith, said container having at least one isolated discharge section with at least one discharge aperture therein in substantial alignment with the adjacent edge of the spreader, means for rotating said wheel by contact with a spreader supporting wheel; whereby said container rotates with said wheel to periodically dispense said marking material along the edge of the spreader path.

4. In a wheel supported spreader, the improvement defined by claim 3 wherein said marking wheel is mounted on an axle which is supported for movement in an arcuate path in the plane of said marking wheel.

5. In a wheel supported spreader, the improvement defined by claim 4 wherein said axle is rotatably mounted at one end of a swinging arm, said arm is pivotally mounted about a rod, said rod extending from within a rolled flange on said spreader.

6. In a spreader, the improvement comprising a device for marking the path taken by said spreader, said marking device having a wheel rotatable about a substantially horizontal axis, a container having therewithin pulverant material, means rigidly and removably holding said container to said wheel so that said container rotates about said axis, said container having at least one isolated discharge section having at least one aperture therein in substantial alignment with the adjacent edge of the spreader, means for rotating said wheel in response to the movement of said spreader across a surface to be covered; whereby said container rotates with said wheel to periodically dispense said marking material along the edge of the spreader path.

7. In a spreader, the improvement defined in claim 6 wherein said container is a closed cylinder in form, and one of said discharge sections is located in one circular end of said container.

8. In a spreader, the improvement defined in claim 7 wherein said container is a can of pulverant household cleanser.

9. In a spreader, the improvement comprising a device for marking the path taken by said spreader, said marking device having a wheel rotatable about a substantially horizontal axis and in contact with the surface to be covered, a container having marking material therein, means rigidly holding said container to said wheel so that said container rotates about said axis, said container mounted in substantial alignment with the adjacent edge of the spreader and having at least one isolated discharge section with at least one discharge aperture therein; whereby said container rotates with said wheel to periodically dispense said marking material along the edge of the spreader path.

References Cited by the Examiner
UNITED STATES PATENTS 2,991,914  7/61  Janssen.
3,079,049  2/63  Barnhard _____ 222—169
3,114,481  12/63  West _____ 222—177 X LOUIS J. DEMBO, *Primary Examiner.*